Aug. 12, 1952 R. THORENS 2,606,455
ACTUATING DEVICE FOR RECORD-PLAYING TURNTABLES
Filed Jan. 16, 1951 2 SHEETS—SHEET 1
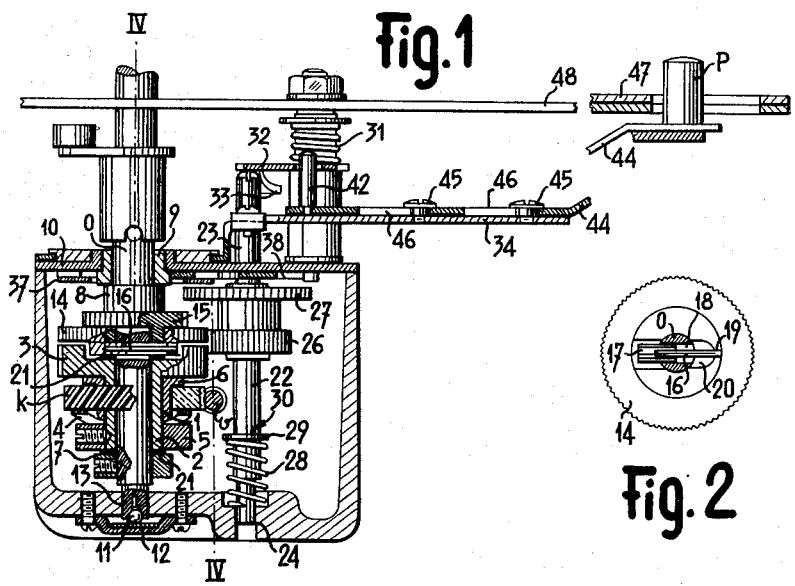
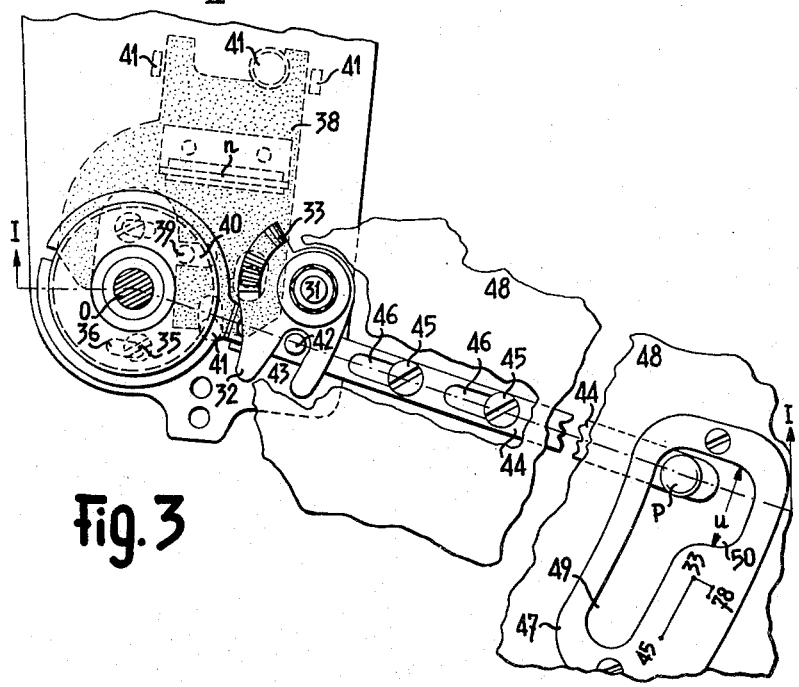
INVENTOR
Robert Thorens.
BY
ATTORNEY Aug. 12, 1952     R. THORENS     2,606,455
ACTUATING DEVICE FOR RECORD-PLAYING TURNTABLES
Filed Jan. 16, 1951     2 SHEETS—SHEET 2
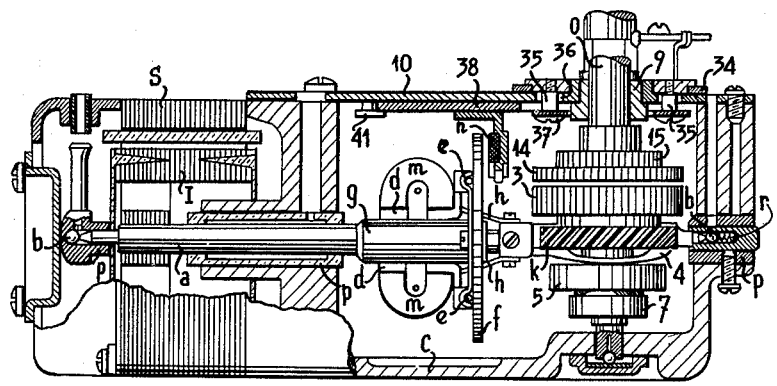
Fig. 4
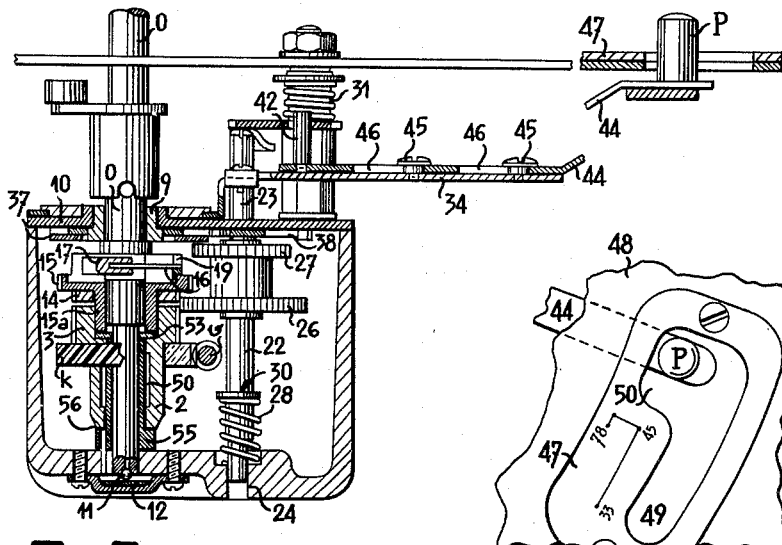
Fig. 5
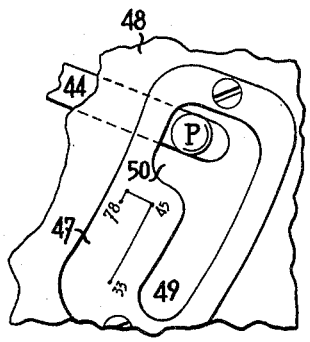
Fig. 6
INVENTOR
Robert Thorens.
BY
ATTORNEY Patented Aug. 12, 1952

2,606,455

UNITED STATES PATENT OFFICE 2,606,455

ACTUATING DEVICE FOR RECORD-PLAYING TURNTABLES

Robert Thorens, Sainte-Croix, Switzerland, assignor to Hermann Thorens S. A., Sainte-Croix, Switzerland, a limited liability stock company of Switzerland Application January 16, 1951, Serial No. 206,148
In Switzerland February 6, 1950

9 Claims. (Cl. 74—472)

1

The present invention relates to an actuating device for a record-playing turntable comprising an electric motor, a speed change device and a speed governor. Up till now, these actuating devices comprise two controlling organs, one connected to the speed change device, enabling to modify the transmission ratio between the motor and the record-playing turntable, the other connected to the speed governor and enabling to choose and to fix the motor's revolving speed. Now, these two controlling organs can be the cause of wrong operation, especially when the turntable must be capable of being actuated at the three revolving speeds presently required, that is to say 33⅓, 45 and 78 revolutions per minute. Moreover, in such cases, to every position of the controlling organ connected to the speed governor, correspond three different speeds of the turntable. If it is desired to enable the user to adjust accurately the turntable's revolving speed, one must provide three scales or graduations in front of the various positions that the said controlling organ can occupy, which, on the one hand, is not easy, and, on the other hand, is a source of mistakes.

The actuating device, object of the present invention, aims at eliminating above mentioned drawbacks by the fact that it includes a single control organ, mechanically connected to the speed change device, on the one hand, and to the speed governor, on the other hand, in order to permit provoking the change of transmission ratio between the motor and the record-playing turntable, on the one hand and, on the other hand, to choose and to fix the revolving speed adjusted by the speed governor.

The attached drawing shows schematically and by way of example two embodiments of the actuating device.

Fig. 1 is a cross-section view of same, taken along line I—I of Fig. 3.

Fig. 2 is a detail view.

Fig. 3 is a top view, certain parts being cut away or suppressed for the sake of greater clearness of the drawing.

Fig. 4 is a cross-section view taken along line IV—IV of Fig. 1.

Fig. 5 is a cross-section view of the second embodiment of the device.

Fig. 6 is a part top view of same.

According to Figs. 1 to 4 of attached drawing, the actuating device comprises, like other known devices, an electric motor, of which the stator S is fixed rigidly to a casing C, while the rotor I is fixed to the end of a driving shaft $a$ revolving in

2 bearings $p$ provided in the said casing. Axial stops $b$, of which one is subjected to the action of a spring $r$, fix the axial position of the driving shaft. The latter carries a speed governor of known type comprising centrifugal masses $m$ carried, on the one hand, by arms $d$ articulated at $e$ on a disc $f$ fastened to a socket $g$ sliding on the driving shaft $a$ and, on the other hand, by spring blades $h$, of which the ends are rigidly fixed on the driving shaft. A stop $n$, which can be displaced parallelly to the shaft $a$ limits the axial displacement of the disc and constitutes a brake.

The driving shaft further carries a worm $v$, in mesh with an helicoidal wheel $k$ mechanically connected to a shaft $o$ carrying the record-playing turntable.

In the embodiment of the actuating device in accordance with Figs. 1 to 4, this helicoidal wheel is fastened to a socket 1 revolving freely on the extension 2 of the hub of a gear wheel 3 revolving freely on the shaft $o$ carrying the record-playing turntable (which is not represented). An elastic washer 4 resting on a ring 5 rigidly fixed to the end of the extension 2, applies a collar 6 of this socket 1 to the front face of the gear wheel 3. Thus, the helicoidal wheel $k$ is mechanically connected to the gear wheel 3 by a friction coupling. The axial position of this gear wheel 3 is defined, on the one hand, by a ring 7 rigidly fixed to the shaft $o$, and, on the other hand, by a ring 8 resting on the front face of a bearing 9 traversing the cover 10 of the casing C, and in which revolves said shaft $o$. This shaft is vertical and its end revolves in a guide 13 and rests, by means of a ball 11, on a resting plate 12 fastened to the casing C. Between the ring 8 and the gear wheel 3 are mounted two gear wheels 14 and 15, mechanically connected to the shaft $o$ by means of an elastic coupling. The latter comprises an elastic rod 16, of which one of the ends is encased in a screw 17 blocked in a transversal drilling 18 of the shaft $o$ and of which the other end is engaged without play, in a radial drilling 19 made in the hub of the gear wheel 14. Finally, a clearing 20 made in the front face of this hub is provided for housing the screw 17 and its elastic rod 16. It will be seen that the part of the rod 16 situated between its encasement and its end engaged in the drilling 19 can elastically deform itself under the action of the driving torque of the shaft $o$. Lastly, washers 21 are mounted on the shaft $o$ at the two ends of the hub of the gear wheel 3. These washers are made of material presenting a low friction index.

An axle 22 sliding and revolving in guides 23, 24, provided in the walls of the casing C carries a set of sliding gears 26, 27, intended to come alternatively in mesh with the gear wheels 14 and 15. Moreover, the gear 26 always remains in mesh with the gear wheel 3, the width of the latter being designed accordingly. A spring 28 resting on the bottom of the casing C and on a washer 29 applied on a shoulder 30 of the axle 22 tends to keep the latter in the position represented on Fig. 1, for which the gear 26 being simultaneously in mesh with the gear wheels 3 and 14, the transmission ratio between the helicoidal wheel k and the shaft o is equal to the unity.

On the contrary, by exerting a push on the end of the axle 22, the user can provoke the meshing of the gear 27 with the gear wheel 15, and therefore the actuating of the shaft o at a revolving speed greater than that of the helicoidal wheel k. For this purpose, the casing C carries a pillar 31, on which is pivoting an actuating organ 32 presenting an incline 33 intended to co-operate with the end of the shaft 22.

Finally, a single controlling organ P is provided in order to provoke, on the one hand, the displacements of the mobile stop n of which the position defines the revolving speed of the worm v, and, on the other hand, the displacements of the actuating organ 32, of which the position defines the position of the set of sliding gears 26, 27 and, consequently, the transmission ratio between the helicoidal wheel k and the shaft o.

This single control organ is fastened to a part 44 carried by an arm 34, pivoting, by one of its ends, co-axially to the shaft o. This end is elastically kept in contact with the cover 10 of the casing by means of two screws 35 traversing ports 36, and under the heads of which is engaged an elastic washer 37 of which the edges rest on a sliding part 38 carrying a mobile stop n. This part 38 is actuated by a finger 39 fastened to the arm 34 and engaged in a port 40 made in said part 38. The latter is guided by guides 41 imposing to the mobile stop n a displacement parallel to the driving shaft. Thus, by angularly displacing the control organ P, the user has the possibility of modifying the position of the mobile stop n, and thus to modify the revolving speed of the shaft a adjusted by the speed governor.

The part 44 is capable of being radially displaced in relation to the arm 34, and carries a finger 42 intended to co-operate with the edges of a notch 43 made in the actuating organ 32. The arm 34 carries two guides 45 engaged in two ports 46 made in the part 44.

By examining the attached drawing, it will be seen that a radial displacement of the part 44 provokes an angular displacement of the actuating organ and thus the displacement of the set of sliding gears.

In order to avoid any possibility of wrong operation, the control organ P is engaged in a guide 47 fixed to the base plate 48 of the gramophone. This guide presents a port 49 having the shape of an arc of circle centered on the shaft o. The length of this arc of circle is so chosen as to permit to shift, by modification of the position of the stop n, the revolving speed of the shaft o from 32 revolutions per minute to 46 revolutions per minute. Moreover, this arc of circle is situated at a distance from the shaft o such that the finger 42 keeps the actuating organ 32 in a position for which the incline 33 is out of reach of the axle 22, so that the transmission ratio between the helicoidal wheel k and the shaft o is equal to one.

This guide 47 further presents at one of the ends of the port 49 an indentation 50 enabling to radially displace the control organ P of a value sufficient to provoke, by means of the finger 42 co-operating with the notch 43, the angular displacement of the actuating organ 32, of which the incline 33, acting on the end of the shaft 22, provokes the shifting of the transmission ratio between the helicoidal wheel k and the shaft o. The diameters of the gear wheels 15 and 27, which are then brought in mesh, are chosen in such a way that the shaft o is actuated at 78 revolutions per minute.

The indentation 50 presents a width u enabling an angular displacement of the control organ P of a value sufficient for provoking, by modification of the position of the stop n, a variation from 76 to 80 revolutions per minute of the revolving speed of the shaft o.

From above explanations and from the study of the attached drawing, it is easy to realize that this actuating device enables, by operating the single control organ P, to obtain the three revolving speeds which are necessary to-day for playing the various existing records on the one hand, and, on the other hand, to choose and to fix the exact value of the desired revolving speed. Moreover, the guide 47, in which is engaged this single control organ constitutes an interlocking organ between the governor and the speed change device prohibiting any wrong operation.

The second embodiment represented on Figs. 5 and 6 differs from the above described one mainly in the speed change device conception. Indeed, while the above described speed change device presents two transmission ratios, of which one is equal to unity and the other bigger than one (multiplicator), the device represented on Fig. 5 presents a transmission ratio equal to unity and a transmission ratio smaller than one (demultiplicator). In this alternative, the helicoidal wheel k is fastened to the extension 2 of the hub of the gear wheel 3. The latter revolves freely on a pivot 50 rigidly fixed on the bottom of the casing C and traversed by the shaft o.

The gear wheel 14 is forced on the extension 15a of the hub of the gear wheel 15. The end of this hub rests, by means of a washer 53, on the upper end of said pivot 50, in the bottom of a housing made in the hub of the gear wheel 3. The length of the pivot 50 and the housing of the hub of the wheel 3 are such that this wheel 3 will never be able to drive the wheel 14 by mutual friction.

The pivot 50 presents a shoulder 55 on which rests the hub 2 by means of a washer 56.

The guide 47 of the single control organ P is similar to that described with reference to Figs. 1 to 4. However, it is placed in a reverse position. Indeed, when this control organ is in the pushed position, that is to say in its position nearest to the shaft o, the transmission ratio equals one, and the shaft o is driven at 78 revolutions per minute. On the contrary, for the drawn-out position of this control organ, the gear wheels 15 and 27 are in mesh and reduce the speed of shaft o to 45 revolutions per minute. This set of gears must therefore remain in mesh when the control organ is angularly displaced in order to adjust this speed to 33 revolutions per minute by modification of the position of the mobile stop n.

Two embodiments of the device which is the object of the invention have been herein described with reference to the attached schematical drawing, but it is clear that many alternatives can be provided for.

Indeed, the speed change device and the speed governor herein described can be replaced directly by one or the other of the various types of speed change devices and speed governors used for many years by designers of gramophones. It goes without saying that the mechanical connections between the control organ P, the speed governor, on the one hand, and the speed change device, on the other hand, will be adapted to the requirements imposed by these devices.

However, it is advantageous to provide a design of the speed change device such that, as in the case of the two above described embodiments which are represented on the attached drawing, none of the revolving organs co-axial to the shaft o carrying the record playing turntable should be actuated at a speed greater than that of said shaft. The aim of this is to keep the friction losses down to a value as low as possible.

I claim:

1. In a driving appliance for a record-playing turntable, the combination, comprising, a frame, a motor in the frame including a shaft having a governor for changing and maintaining the speed of the shaft and including adjustable means, a speed change device in the frame and driven by the shaft, and including movable elements, manually operable means mounted on the frame and movable along a predetermined path to adjust the speed governor means for a certain shaft speed, and also movable along a second predetermined path to change the transmission ratio of the speed change device.

2. The combination according to claim 1 and wherein the speed change device is operable at two different transmission ratios.

3. The combination according to claim 1 and wherein the speed change device is operable at two different transmission ratios and the manually operable means includes a movable stop moving the governor to either of two different positions, each controlling the speed of the shaft at the same transmission ratio.

4. The combination according to claim 1 and wherein the speed change device is operable at two different transmission ratios of which one is equal to one and the speed governor comprises a movable stop adjusting by its movement the shaft speed and maintaining by its position the shaft speed at least at two different values for the same transmission ratio of the speed change device.

5. The combination according to claim 1 and wherein the speed change device is operable at two transmission ratios of which one equals one and the other is greater than one and wherein the speed governor comprises a mobile stop adjusting by its movement the shaft speed and maintaining by its position the speed at either of two values for the same transmission ratio of the change speed device.

6. The combination according to claim 1 and wherein the speed change device is operable at two different transmission ratios of which one equals one and the other is smaller than one and wherein the speed governor comprises a movable stop adjusting by its movement and maintaining by its position the speed at either of two values for the same transmission ratio of the speed change device.

7. The combination according to claim 1 and wherein the speed change device is operable at two different transmission ratios and comprises rotating elements coaxial with the turntable shaft and freely revolving on the turntable shaft and actuated at a speed at the most equaling the turntable shaft speed.

8. The combination according to claim 1 and wherein the change speed device is operable at two different transmission ratios and the speed governor comprises a movable stop adjusting by its movement the shaft speed and maintaining same by its position at either of two values for the same transmission ratio of the change speed device and wherein the manually operable means is displaceable along two angularly related paths, a displacement along one of these paths displacing the stop of the governor while a displacement along the other path causes a displacement of the slidable element of the change speed device.

9. The speed combination according to claim 1 and wherein the change speed device is operable at two different transmission ratios and the speed governor comprises a movable stop adjusting by its movement the shaft speed and maintaining same by its position at either of two values for the same transmission ratio of the change speed device and also comprising a guide in the frame and wherein the manually operable means is displaceable in the guide along two angularly related paths, a displacement along one of these paths displacing the stop of the governor while a displacement along the other path causes a displacement of the slidable element of the change speed device.

ROBERT THORENS.

REFERENCES CITED

The following references are of record in the file of this patent:

UNITED STATES PATENTS

| Number | Name | Date |
|---|---|---|
| 911,030 | Cookingham | Feb. 2, 1909 |

OTHER REFERENCES

Allied Radio Catalog No. 117 of Allied Radio Co., Chicago, Ill., page 113.